(12) United States Patent
Canavan et al.

(10) Patent No.: US 7,055,951 B2
(45) Date of Patent: Jun. 6, 2006

(54) SAFETY EYEWEAR ASSEMBLY WITH PRESCRIPTION INSERT

(75) Inventors: Richard W. Canavan, Woodstock, CT (US); Laurent Froissard, Cranston, RI (US)

(73) Assignee: Bacou-Dalloz Eye & Face Protection, Inc., Smithfield, RI (US)

( * ) Notice: Subject to any disclaimer, the term of this patent is extended or adjusted under 35 U.S.C. 154(b) by 0 days.

(21) Appl. No.: 10/904,260

(22) Filed: Nov. 1, 2004

(65) Prior Publication Data

US 2006/0098159 A1     May 11, 2006

Related U.S. Application Data

(60) Provisional application No. 60/516,814, filed on Nov. 11, 2003.

(51) Int. Cl.
    *G02C 7/08*     (2006.01)
(52) U.S. Cl. .......................... 351/57; 351/58
(58) Field of Classification Search .............. 351/47, 351/48, 57, 58; D16/900
See application file for complete search history.

(56) References Cited

U.S. PATENT DOCUMENTS

| | | | |
|---|---|---|---|
| 1,280,515 A * | 10/1918 | Mauhart, Jr. ............... | 351/47 |
| 1,586,110 A * | 5/1926 | Newhouse .................. | 351/48 |
| 2,351,287 A | 6/1944 | Reichert ..................... | 88/41 |
| 2,607,919 A | 8/1952 | Stegman ..................... | 2/443 |
| 2,949,609 A | 8/1960 | Sager ......................... | 2/13 |
| 2,993,209 A | 7/1961 | Monahan, Jr. et al. ...... | 2/428 |
| 3,051,957 A | 9/1962 | Chan .......................... | 2/428 |
| 3,146,295 A | 8/1964 | Roland ....................... | 351/155 |
| 3,458,866 A | 8/1969 | De Man ...................... | 2/12 |
| 3,600,069 A | 8/1971 | McNeill ...................... | 351/47 |
| 4,023,214 A | 5/1977 | Waldherr ..................... | 2/444 |
| 4,659,196 A | 4/1987 | Gazeley ...................... | 351/57 |
| 4,930,163 A | 6/1990 | King ........................... | 2/444 |
| 5,170,502 A | 12/1992 | Hegendorfer ................ | 2/13 |
| 5,247,706 A | 9/1993 | Mark .......................... | 2/9 |
| 5,412,438 A | 5/1995 | Bolle .......................... | 351/44 |
| 5,428,407 A | 6/1995 | Sheffield ..................... | 351/58 |
| 5,608,470 A | 3/1997 | Sheffield ..................... | 351/47 |
| 5,617,588 A | 4/1997 | Canavan et al. ............. | 2/428 |
| 5,790,230 A | 8/1998 | Sved ........................... | 351/138 |
| 5,793,463 A | 8/1998 | Hirschman et al. .......... | 351/47 |
| 5,907,384 A | 5/1999 | Kirsch et al. ................ | 351/48 |
| 5,929,963 A | 7/1999 | McNeal ....................... | 351/47 |
| 6,089,707 A | 7/2000 | Shapiro ....................... | 351/47 |

(Continued)

*Primary Examiner*—Huy Mai
(74) *Attorney, Agent, or Firm*—Barlow, Josephs & Holmes, Ltd.

(57) ABSTRACT

A safety eyewear assembly includes safety eyewear and a prescription lens insert. The safety eyewear includes a frame having a brow bar configured to extend across the brow of the wearer and further includes a plurality of raised shoulders spaced along the brow bar, and a unitary safety lens removably mounted adjacent the outer surface of the brow bar wherein vertically extending venting channels are formed between the outer surface of the brow bar and an inner surface of the lens. The prescription lens insert includes a left lens frame configured for receiving a prescription lens, a right lens frame configured for receiving a prescription lens, and a sculpted connecting wire configured to be received in interfitting mating relation with at least one of the raised shoulders of the brow bar, and further configured to extend through the venting channels such that the sculpted wire is releasably captured between the outer surface of the brow bar and the inner surface of the lens.

15 Claims, 10 Drawing Sheets

U.S. PATENT DOCUMENTS

| | | | |
|---|---|---|---|
| 6,089,708 A | 7/2000 | Ku | 351/47 |
| 6,206,519 B1 * | 3/2001 | Lin | 351/57 |
| 6,382,787 B1 | 5/2002 | Xie | 351/47 |
| 6,533,411 B1 | 3/2003 | Chen et al. | 351/47 |
| D493,189 S * | 7/2004 | Canavan | D16/330 |
| 2002/0024630 A1 | 2/2002 | Hornig | 351/41 |

* cited by examiner

SAFETY EYEWEAR ASSEMBLY WITH PRESCRIPTION INSERT

CROSS-REFERENCES TO RELATED APPLICATIONS

This application claims priority to earlier filed U.S. Provisional Patent Application No. 60/516,814, filed Nov. 11, 2003. The earlier filed U.S. Pat. No. 6,196,681 B1, filed May 18, 2000, the contents of which are incorporated herein by reference.

BACKGROUND

Safety eyewear is worn for a variety of safety reasons. As a result, a variety of safety eyewear types, each specifically designed and intended for a particular use or a particular environment, has been developed. For example, safety eyewear are often worn to protect a wearer's eyes from debris during metal machining operations. In such an environment, metal shards may be propelled towards an operator's eyes. Safety eyewear is also worn in the chemical industries to protect employees from airborne chemicals resulting from splashes or spills. Still further safety eyewear is worn in industries utilizing lasers. Lasers can be damaging to the eye if exposed. Lasers are particularly dangerous because different wavelengths of laser light may require different lenses for filtering the damaging light.

Because of the proliferation of safety requirements now requiring greater numbers of employees to wear safety eyewear, cost, ease of replacement of the lenses, the ability to accommodate prescription lenses, and fashion have now become prime concerns for customers of these safety products.

One factor that has not been adequately addressed is the ability to mount prescription lenses onto safety glasses that simply comprise a plastic brow bar style frame and a unitary shield-type safety lens. For example, please refer to U.S. Pat. No. 6,196,681, which illustrates such a pair of safety eyewear including the brow bar style frame. The '681 patent is co-owned with the present application, and the entire teachings of the '681 patent are hereby incorporated by reference.

SUMMARY

The instant invention relates to safety eyewear and more particularly to a safety eyewear assembly comprised of a brow-bar style frame, a single removable safety lens and prescription insert which is received and supported within the venting channels formed between the brow bar of the frame and the safety lens.

We believe there is a significant market need for a product which would allow mounting of prescription lenses into safety glasses having the simplified brow-bar style frame, such as those illustrated in the '681 patent. The prescription insert of the instant invention fulfills this need.

The safety eyewear comprises a frame and a transparent unitary shield-type lens. The frame includes a rigid brow bar portion, which extends across the brow of the wearer between the temples, and further includes a nose portion, which is integrally formed with the brow bar portion and extends downwardly from the central portion of the brow bar portion. The outwardly facing surface of the brow bar is formed with a central raised shoulder and additional raised shoulders that are spaced along the width of the brow bar to form a vertically extending venting channels between the inner surface of the lens and the outer surface of the brow bar when the lens is assembled to the outer surface of the frame. The present invention takes advantage of these venting channels to provide a confined space for releasably mounting and capturing the prescription lens insert.

The prescription insert has a left and right lens frames configured for receiving prescription lenses and a sculpted bridge wire connecting an inner portion of the left lens frame and an inner portion of the right lens frame. The sculpted bridge wire is generally configured and arranged in a triangular shape to fit around central shoulder on the outer surface of the brow bar and through the venting channels on both sides thereof where the sculpted bridge is effectively captured in a fixed position between the outer surface of the brow bar and the inner surface of the lens when the lens is assembled with the frame. The bridge wire thus forms the primary mounting point for supporting the lens frames relative to the frame.

In addition, the insert further has left and right stabilizing temple wires extending from an outer edge of the lens frame upwardly and forwardly through the venting channels at the outer ends of the brow bar. The stabilizing temple wires are provided for the specific purpose of preventing the outer edges of the insert from deflecting inwardly relative to the lens in the event of a frontal impact on the lens. The temple wires thus serve to hold the outer edges of the lens frames in a stable position relative to the lens and frame.

Accordingly, among the objects of the invention are: the provision of a prescription insert for mounting in a safety eyewear assembly comprising a frame and a unitary lens shield; the provision of such safety eyewear wherein the frame of the safety eyewear includes a brow bar, and raised shoulders on the outer surface of the brow bar, and further wherein the raised shoulders form venting channels between the outer surface of the brow bar and the inner surface of the lens when the lens is assembled with the frame; the provision of a prescription insert including left and right lens frames connected by a sculpted wire bridge; the provision of prescription safety eyewear including the safety eyewear and the prescription insert mounted therein; the provision of such prescription eyewear, wherein the sculpted bridge wire of the insert is received and captured within the venting channels of the safety eyewear; and the provision of such prescription eyewear wherein the prescription insert further includes stabilizing temple wires which extend from the outer edges of the left and right lens frames upwardly and forwardly through the venting channels at the outer ends of the brow bar.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 7:
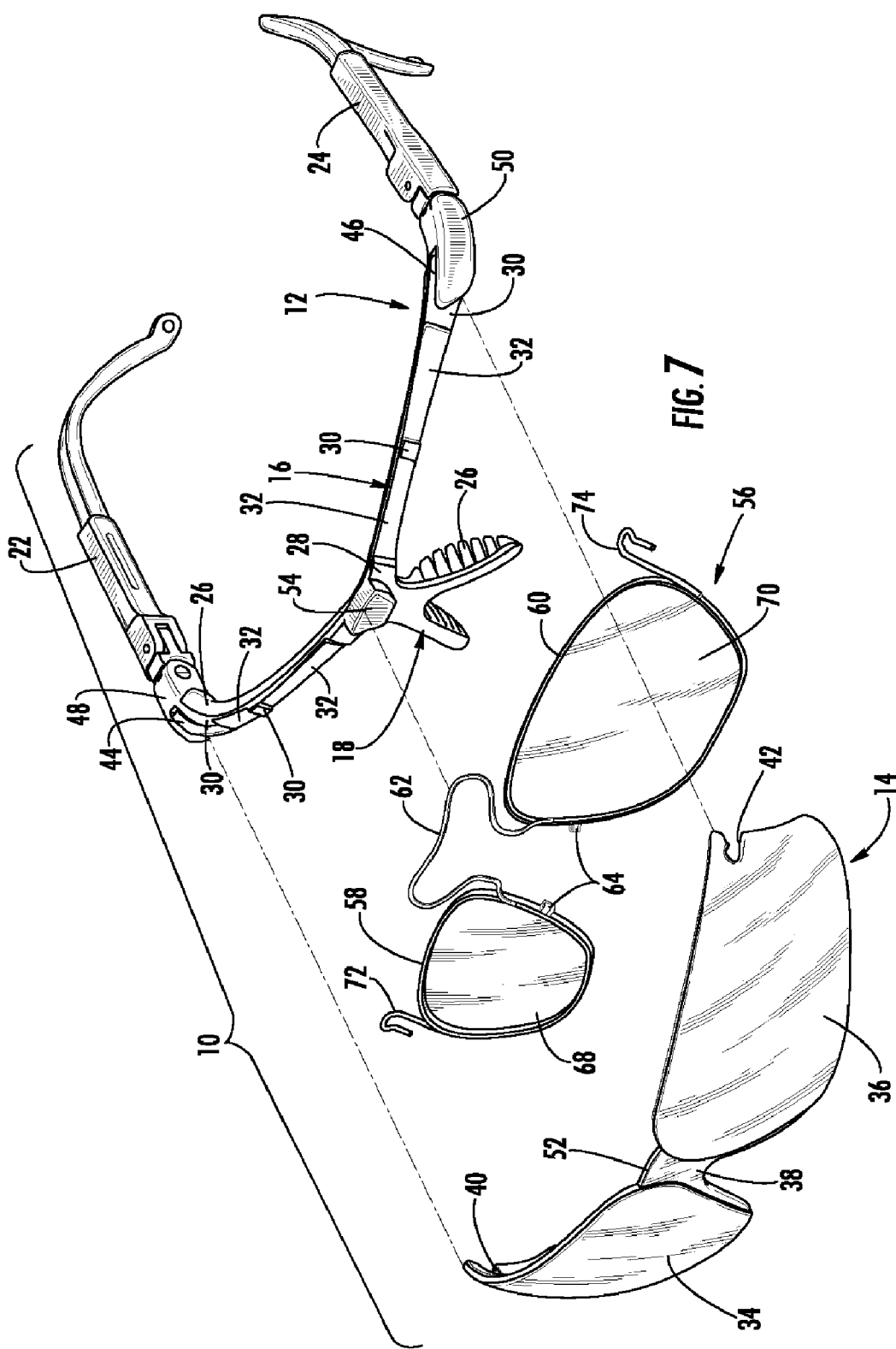
FIG. 7 is an exploded perspective view of the assembly of the inventive prescription insert with the safety glasses.
Figure 8:
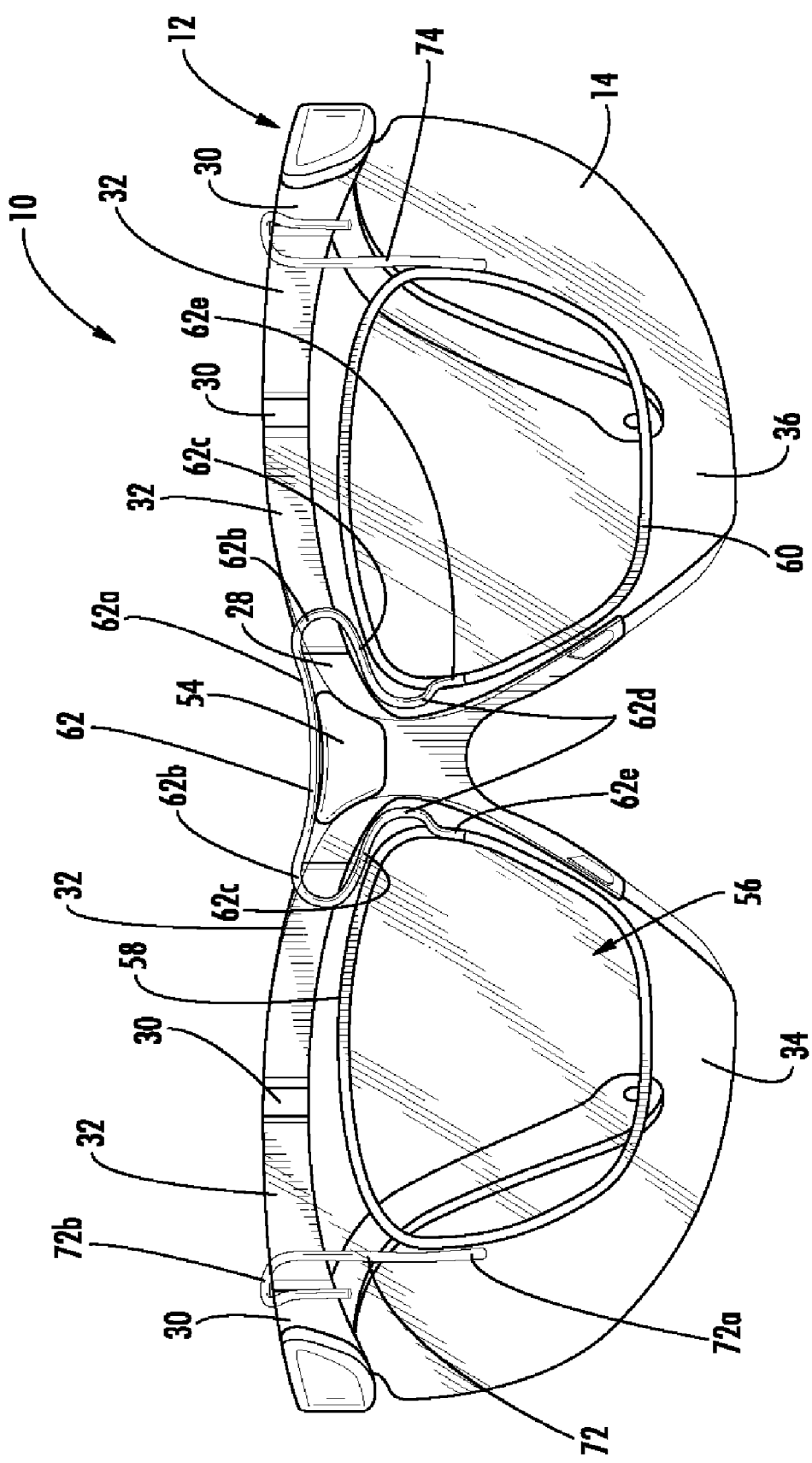
FIG. 8 is a front view of the assembly of the prescription insert and safety glasses.
Figure 9:
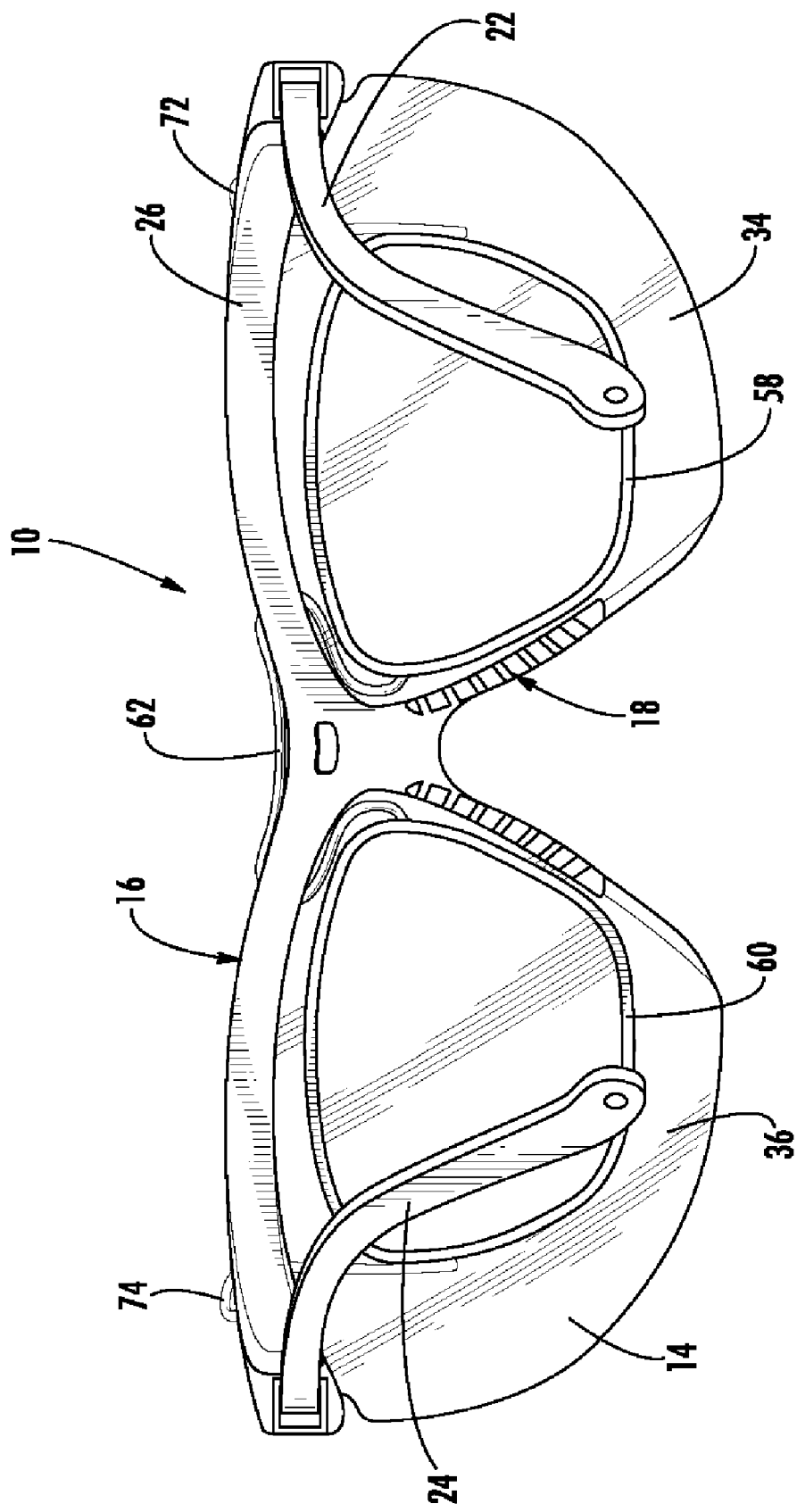
FIG. 9 is a rear view thereof.

Referring now to the drawings, the safety eyewear assembly of the instant invention is illustrated and generally indicated at 10 in FIGS. 7–9. As will hereinafter be more fully described, the instant safety eyewear assembly 10 offers a simple and cost effective solution to the problem of mounting prescription lenses in a pair of safety glasses having a simple brow bar style frame and a unitary lens.

An embodiment of the present invention provides such a solution specifically designed for safety eyewear of the type illustrated in the '681 patent. Referring to FIGS. 1 and 7–9, the safety eyewear as illustrated in the '681 patent comprises a frame 12 and a transparent unitary lens 14. The frame 12 includes a rigid brow bar portion 16, which extends across the brow of the wearer between the temples, and further includes a nose portion 18 which is integrally formed with the brow bar portion 16 and extends downwardly from the central portion of the brow bar portion. The frame portion 12 still further includes temple bar pieces 22, 24 that extend rearwardly from the temples of the brow bar. The temple bar pieces 22, 24 include both angular adjustment and telescoping length capabilities, although the details thereof are not critical to the present invention.

A soft pliable material 26 is formed onto the inwardly facing surface of the brow bar portion 16 and the nose portion 18 in a two shot molding process (See FIG. 7). The soft material provides cushion for comfort and impact protection. More specifically, the frame is molded in a two-shot molding process in which two different types of plastic and/or elastomeric materials are injected into a mold resulting in a unitary construction having different sections thereof with different compositions. Two-shot molding is well known in the art, and has been utilized to provide rigid eyewear frame with softer engagement surfaces, such as a inner face engaging portion of a goggle, as shown in U.S. Pat. No. 5,617,588, and the brow bar/nose pad configuration as shown in '681 patent, the teachings and content of both patents being incorporated herein by reference. As is well known in the art, hard and soft plastic materials are selected according to desired functional properties and complementary chemical bonding properties. When properly selected, the plastics will form a chemical bond at the joining line and create a unitary shape with intact structural integrity.

Turning back to the eyewear assembly, the outwardly facing surface of the brow bar 16 is formed with a central raised shoulder 28 and additional raised shoulders 30 which are spaced along the width of the brow bar 16 to form vertically extending venting channels 32 between the inner surface of the lens 14 and the outer surface of the brow bar 16 when the lens is assembled to the outer surface of the frame 12.

The unitary lens 14 includes left and right lens portions 34, 36 joined together by a nose bridge portion 38. The left and right outer edges of the lenses 34, 36 include mounting slots 40, 42 which are mated with corresponding notches 44, 46 formed in the temple ends 48, 50 of the brow bar 16 (See FIG. 7).

While the frame 12 is formed from a substantially rigid plastic, it nevertheless has some amount of flexibility to allow deformation of the frame 12 during assembly with the lens 14. To assemble the lens 14 to the frame 12, the two side slots 40, 42 in the lens 14 are slidably received into the mating notches 44, 46 in the frame 12. The upper edge 52 of the nose bridge 38 of the lens 14 is then rotated upward and received into a channel formation 54 formed on top of the central raised shoulder 28 in the center of the brow bar 16 to further secure the lens 14 in position.

As indicated above, when the lens 14 is received in assembled relation with the frame 12, the raised shoulders 28, 30 on the outwardly facing surface of the frame 12 provide vertical venting channels 32 between the inner surface of the lens and the outer surface of the frame. The present invention takes advantage of these venting channels to provide a space for mounting a prescription lens insert generally indicated at 56.

Figure 1:
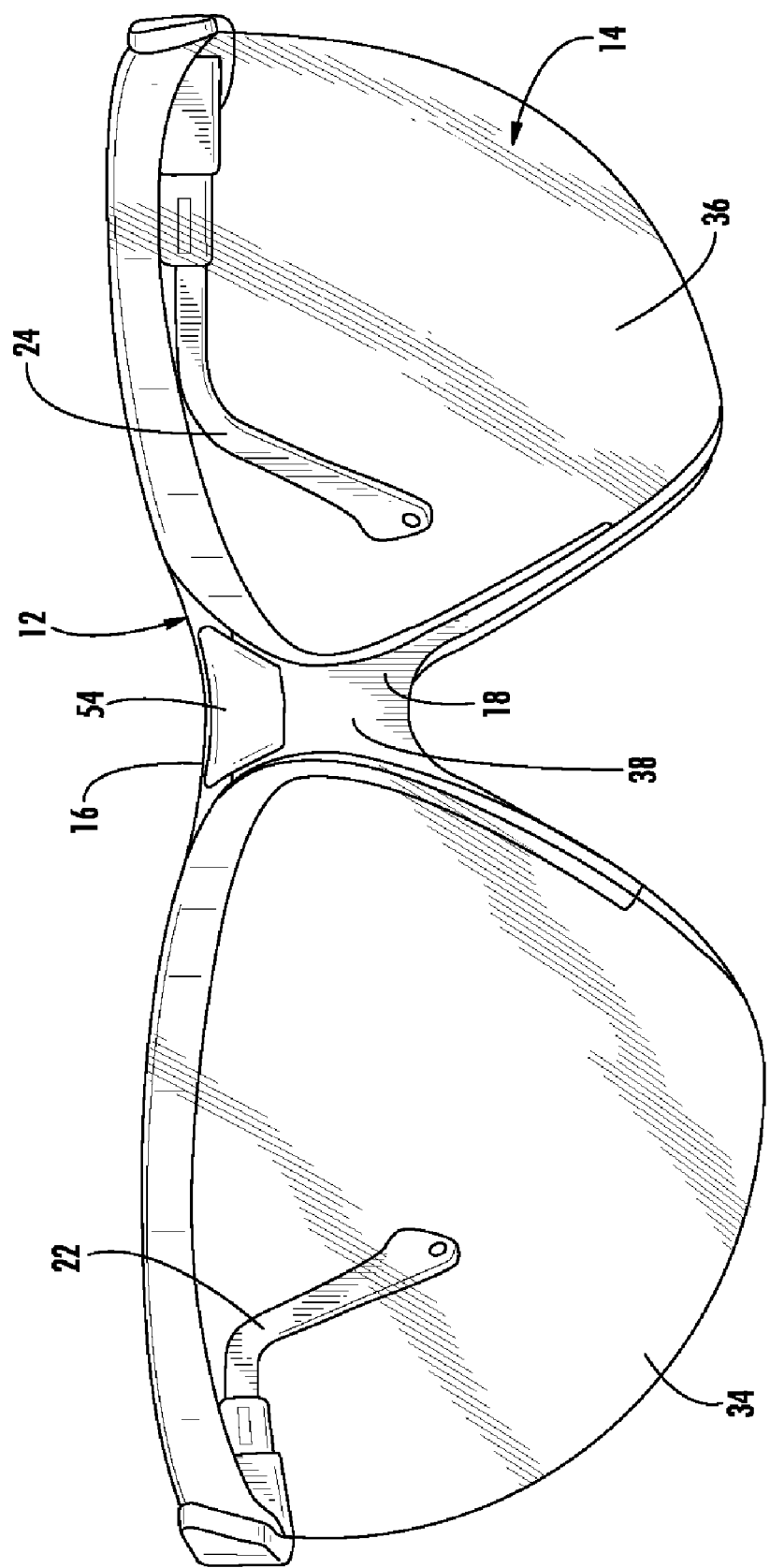
FIGS. 1 and 1A are front perspective views of safety glasses constructed in accordance with the teachings of the present invention.
Figure 1A:
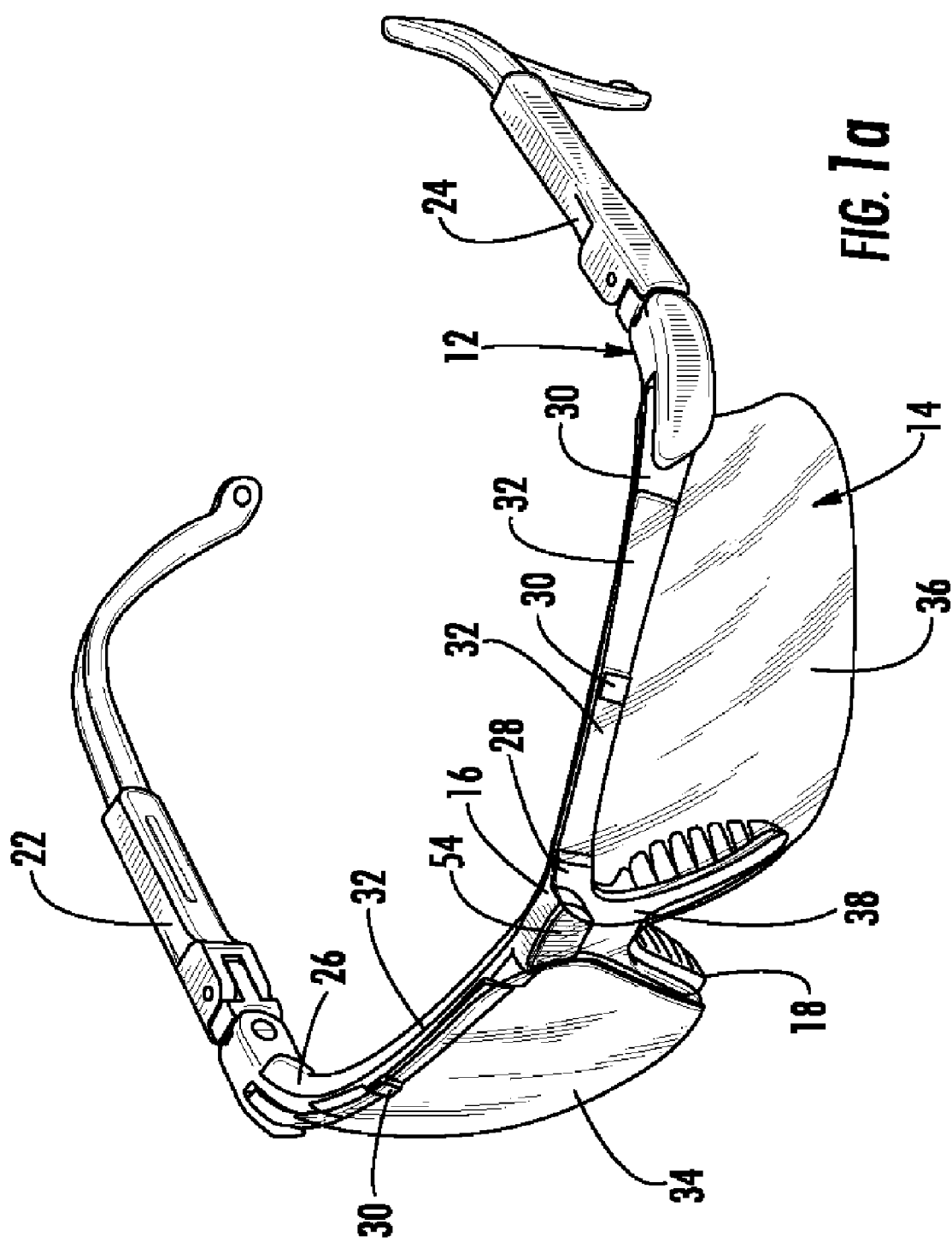
Figure 2:
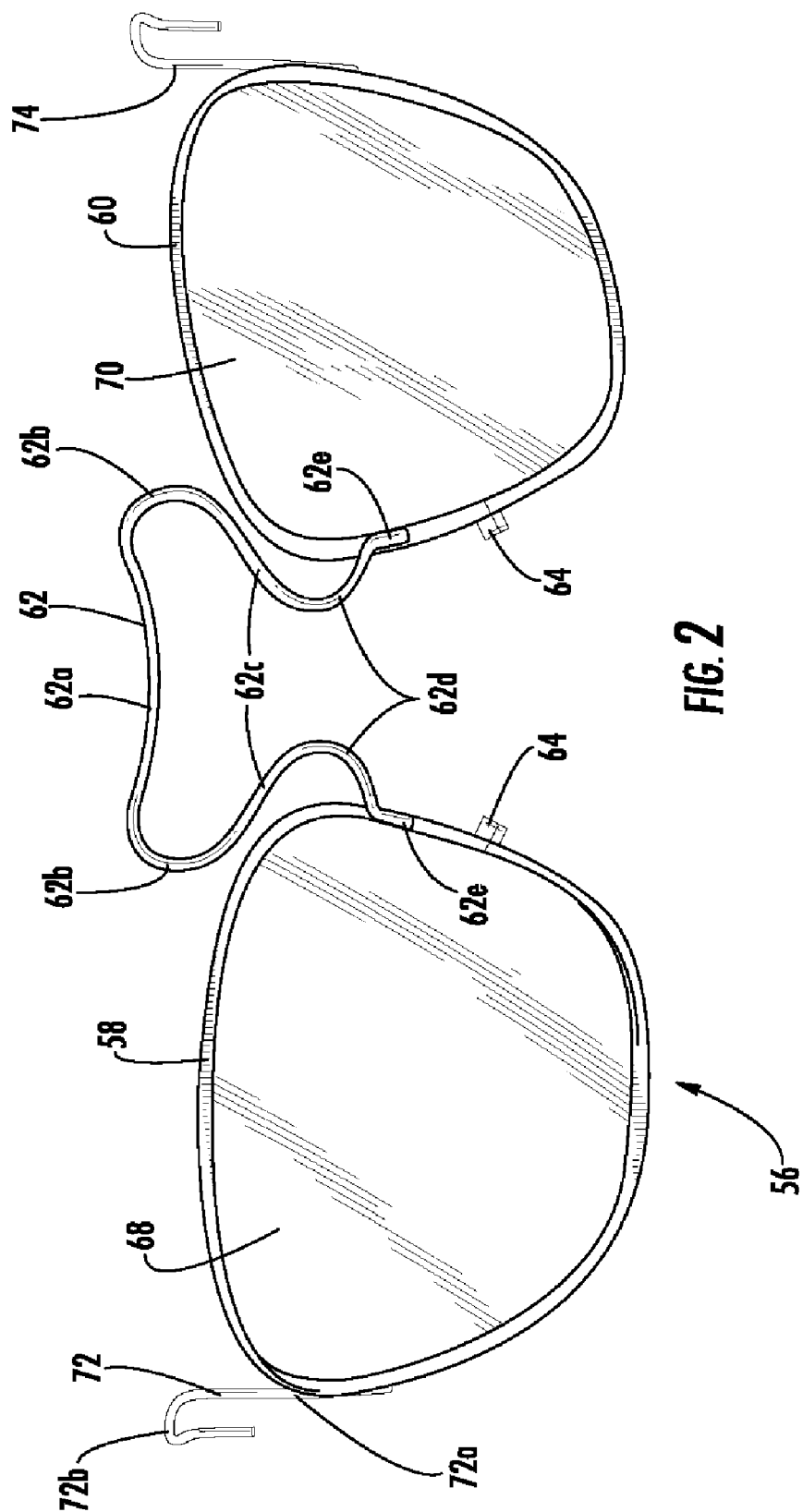
FIG. 2 is a front perspective view of a prescription insert constructed in accordance with the teachings of the present invention.
Figure 3:
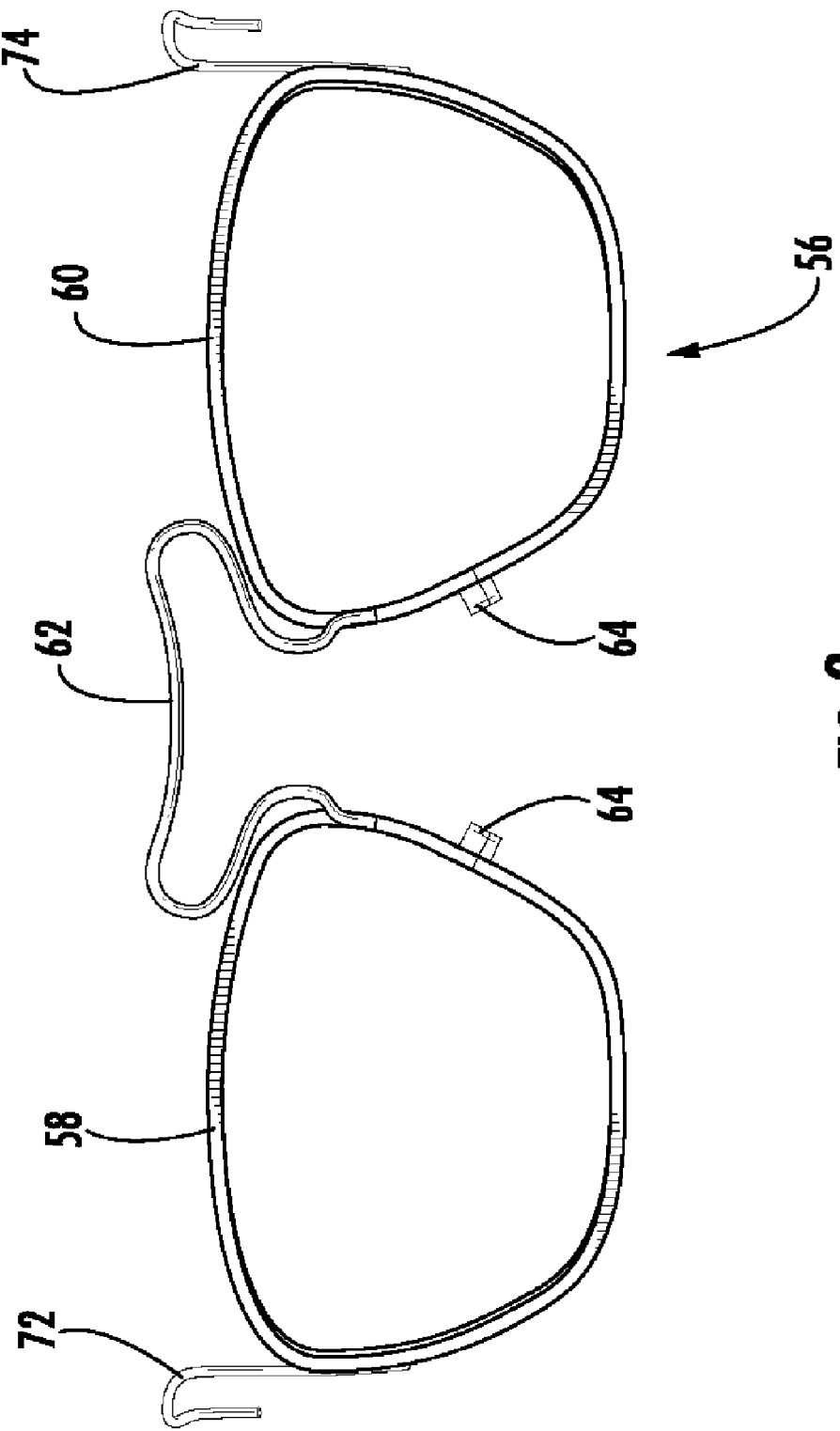
FIG. 3 is a front view thereof.
Figure 4:
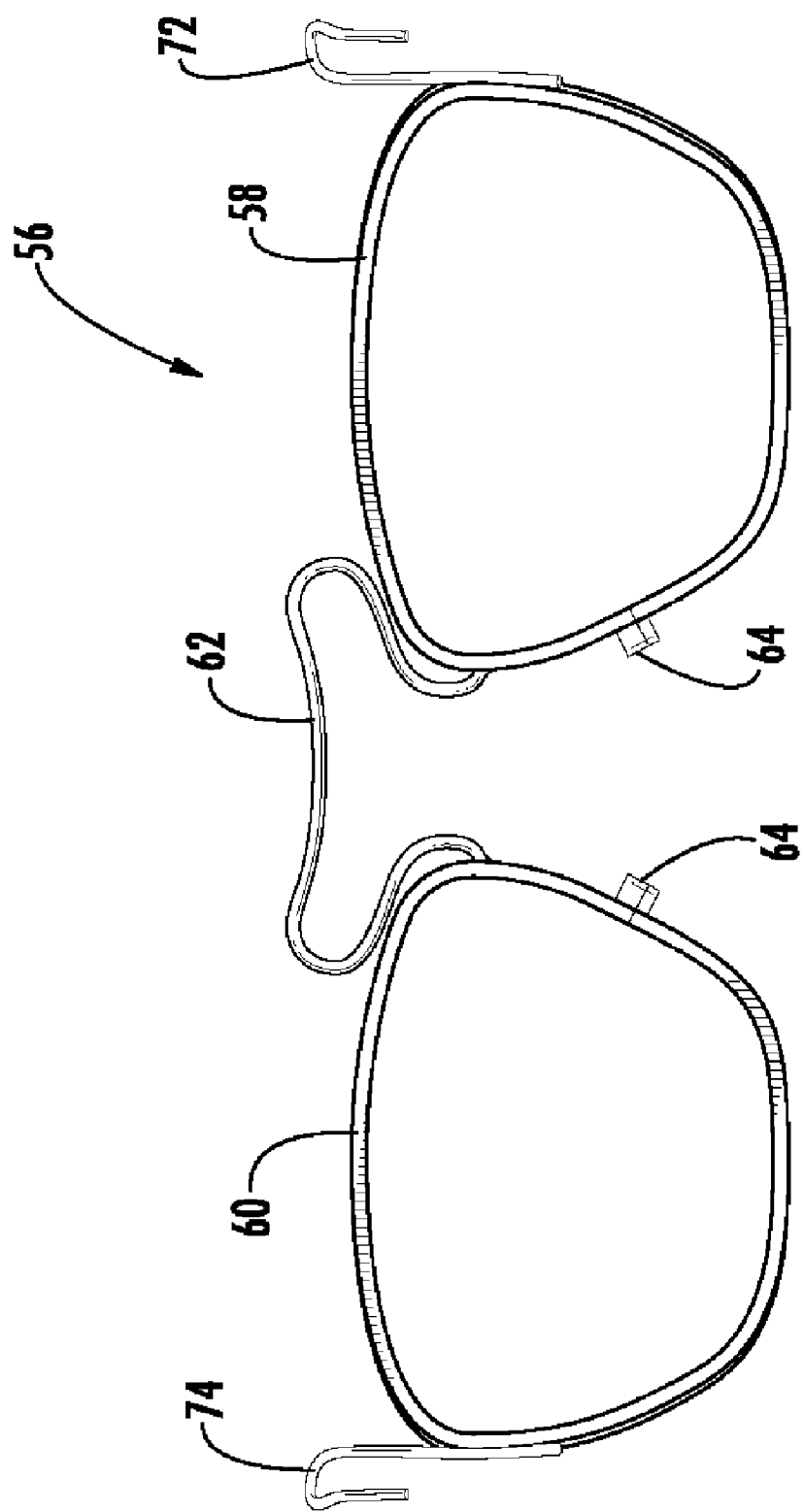
FIG. 4 is a rear view thereof.
Figure 6:
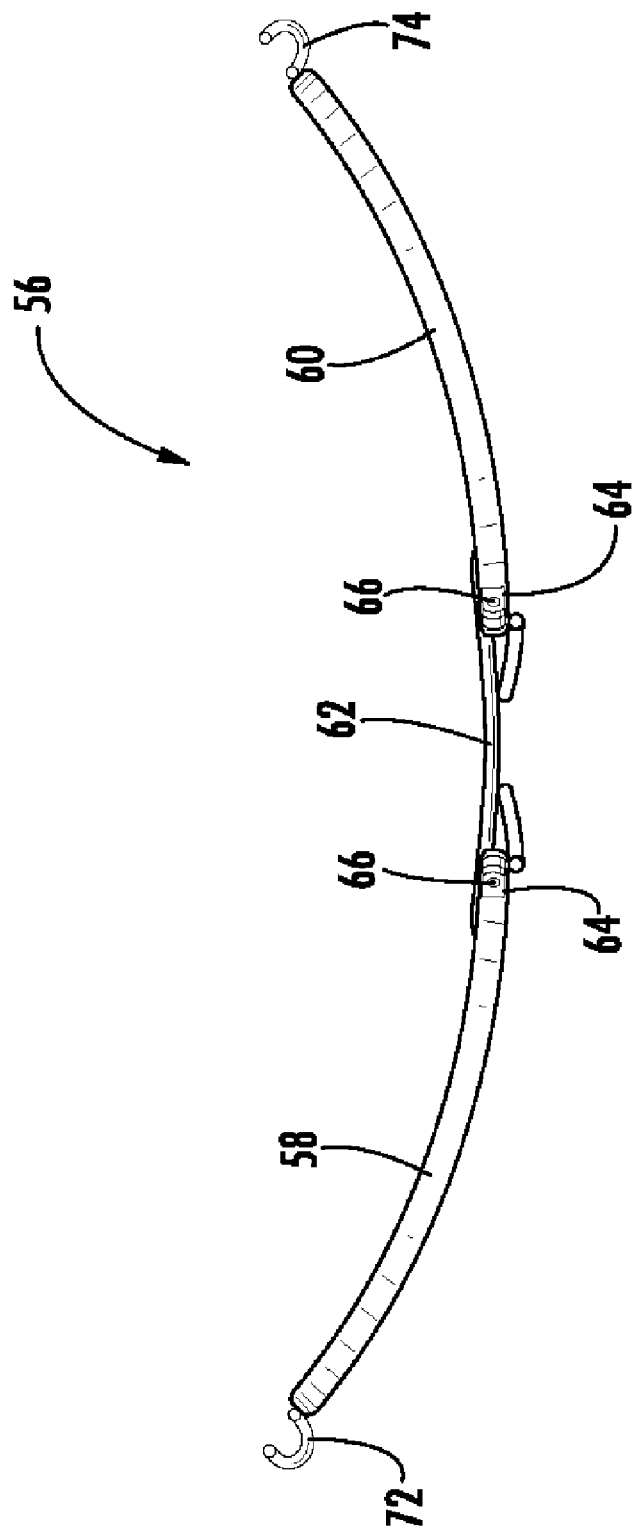
FIG. 6 is a bottom view thereof.

The prescription lens insert 56 comprises left and right lens frames 58, 60 joined in the center by a sculpted bridge wire 62. The left and right lens frames 58, 60 are conventional clamped frame construction (see abutments 64) with a set screw 66 (see FIG. 6) for clamping the split frame portions together and also include an inner groove 67 (See FIG. 3) for receiving the outer ground edge of the prescription lenses 68, 70. The sculpted bridge wire 62 is generally configured and arranged in a triangular shape to fit around the channel formation 54 and central raised shoulder 28 provided on the outer surface of the brow bar 16. The top part 62a of the wire extends over the top edge of the central raised shoulder channel formation 54 with the rounded outer corners 62b of the bridge wire looping down and through the venting channel 23. Once the bridge wire 62 extends through the venting channel, the two side legs 62c angle inwardly to engage the outwardly facing sides 18a of the nose piece 18. The end portions 62d of the side legs 62c are then curved to loop back outwardly where the terminal ends 62e are connected to the lens frames 58, 60. This configuration securely holds the center portion of the prescription lens insert 56 in alignment with the eyewear frame 12 (See FIGS. 2 and 8).

Figure 5:
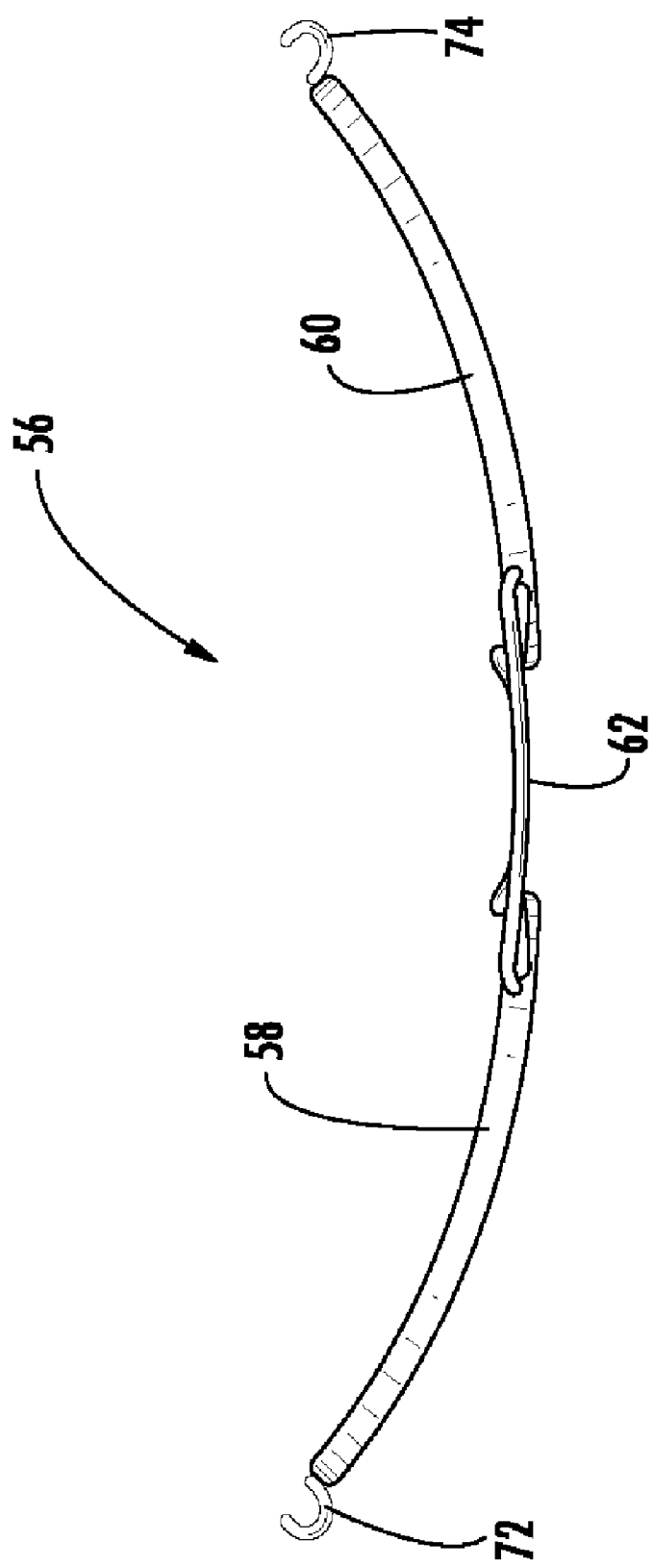
FIG. 5 is a top view thereof.

To maintain the outer edges of the lens frames 58, 60 in proper spaced relation from the wearer's eyes, the outer edges of the lens frames are provided with U-shaped stabilizing temple wires 72, 74. With reference to temple wire 72, a first end 72a of the temple wire 72 is mounted to the outer edge of the lens frame 58 (see FIGS. 2 and 8). The temple wire 72 extends upwardly from the frame 58 and through the outer venting space 32 adjacent the temple bar of the eyewear, bends back over on itself in a "U" 72b and back down through the same venting space. The inverted U-bend in the temple wire 72 is also bent slightly forwardly (See FIGS. 5 and 6 for best view) so that the U-bend 72b hooks over the top edge of the safety lens 14 of the eyewear. These temple wires 72 will help prevent the outer edges of the lens frames 58, 60 from deflecting inwardly towards the wearer's eyes during a frontal impact on the safety lens 14.

To assemble the prescription insert 56 with the eyewear 12, the bridge wire 62 of the insert 56 is placed around the central shoulder 28 on the outer surface of the frame 12 before snapping the safety lens 14 into locked position on the frame 12. The bridge wire 62 effectively aligns the insert 56 over the central raised shoulder 28 and positions the insert 56 in the proper location for mounting. When the safety lens 14 is snapped into position, the bridge wire 62 and temple wires 72, 74 are captured between the lens 14 and the frame 12, and within the venting channels 32 and securely hold the insert in position.

Although not illustrated in the drawings specifically, it should be understood that the concept of providing a sculpted wire on the prescription insert is not limited to providing a central bridge wire. For example, each of the lens frames of the prescription insert could include a sculpted wire on the upper edge thereof which engaged in interfitting relation with one of the peripheral raised shoulder roughly located above the center of each lens frame. In such an embodiment, the lens frames of the prescription insert would be connected by a simple bridge wire, and each of the lens frames would include a respective sculpted wire that would be received around the respective peripheral raised shoulders and through the venting channels.

It can therefore be seen that the instant safety eyewear assembly offers a simple and cost effective solution to the problem of allowing a prescription insert to be mounted in an inexpensive safety eyewear assembly. For these reasons, the instant invention is believed to represent a significant advancement in the art that has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

What is claimed is:

1. A prescription lens insert for safety eyewear comprising:
   a left lens frame configured for receiving a prescription lens;
   a right lens frame configured for receiving a prescription lens; and
   a sculpted bridge wire connecting an inner portion of the left lens frame and an inner portion of the right lens frame together,
   said sculpted bridge wire being configured in a substantially triangular shape with rounded outer corners, two side legs depending from the sculpted bridge wire curving outwardly, the side legs connecting the sculpted bridge wire to the left and right lens frames respectively;
   a left stabilizing wire extending upwardly and forwardly from an outer edge of the left lens frame; and
   a right stabilizing wire extending upwardly and forwardly from an outer edge of the right lens frame.

2. The prescription lens insert for safety eyewear of claim 1 where the left and right stabilizing wires are substantially U-shaped.

3. The prescription lens insert for safety eyewear of claim 1 where the left and right temple wires are bent slightly forwardly.

4. In combination:
   a pair of safety eyewear; and
   a prescription lens insert for said safety eyewear,
   said safety eyewear comprising,
      a frame having a brow bar configured to extend across the brow of the wearer, said brow bar including a plurality of raised shoulders spaced along the brow bar, and
      a unitary safety lens removably mounted adjacent an outer surface of said brow bar wherein vertically extending venting channels are formed between said outer surface of the brow bar and an inner surface of said lens,
   said prescription lens insert comprising,
      a left lens frame configured for receiving a prescription lens,
      a right lens frame configured for receiving a prescription lens, and
      at least one sculpted wire configured to be received in interfitting mating relation with at least one of said raised shoulders of said brow bar, and further configured to extend through said venting channels such that said sculpted wire is releasably captured between said outer surface of said brow bar and said inner surface of said lens.

5. In the combination of claim 4, the prescription lens insert further comprising:
   a left stabilizing wire extending upwardly and forwardly from an outer edge of the left lens frame; and
   a right stabilizing wire extending upwardly and forwardly from an outer edge of the right lens frame,
   said left and right stabilizing wires being configured to extend through said venting channels such that said stabilizing wires are releasably captured between said outer surface of said brow bar and said inner surface of said lens.

6. In the combination of claim 5, said left and right stabilizing wires being substantially U-shaped.

7. In the combination of claim 5, said left and right stabilizing wires being bent slightly forwardly.

8. In combination:
   a pair of safety eyewear; and
   a prescription lens insert for said safety eyewear,
   said safety eyewear comprising,
      a frame having a brow bar configured to extend across the brow of the wearer, said brow bar including a central raised shoulder projecting outwardly from an outer surface thereof, said brow bar further including a plurality of peripheral raised shoulders spaced along the brow bar, and
      a unitary safety lens removably mounted adjacent an outer surface of said brow bar wherein vertically extending venting channels are formed between said outer surface of the brow bar and an inner surface of said lens,
   said prescription lens insert eyewear comprising,
      a left lens frame configured for receiving a prescription lens,
      a right lens frame configured for receiving a prescription lens, and
      a sculpted bridge wire connecting an inner portion of the left lens frame and an inner portion of the right lens frame together, said sculpted bridge wire being configured to be received in interfitting mating relation around said central raised shoulder of said brow bar, and through said venting channels such that said bridge wire is releasably captured between said outer surface of said brow bar and said inner surface of said lens.

9. In the combination of claim 8, said sculpted bridge wire being configured in a substantially triangular shape with rounded outer corners, two side legs depending from the sculpted bridge wire curving outwardly, the side legs connecting the sculpted bridge wire to the left and right lens frames respectively.

10. In the combination of claim 9, said prescription lens insert further comprising:
    a left stabilizing wire extending upwardly and forwardly from an outer edge of the left lens frame; and
    a right stabilizing wire extending upwardly and forwardly from an outer edge of the right lens frame.

11. In the combination of claim 10, said left and right stabilizing wires being substantially U-shaped.

12. In the combination of claim 10, said left and right stabilizing wires being bent slightly forwardly.

13. In the combination of claim 8, said prescription lens insert further comprising:
   a left stabilizing wire extending upwardly and forwardly from an outer edge of the left lens frame; and
   a right stabilizing wire extending upwardly and forwardly from an outer edge of the right lens frame.

14. In the combination of claim 13, said left and right stabilizing wires being substantially U-shaped.

15. In the combination of claim 13, said left and right stabilizing wires being bent slightly forwardly.

* * * * *